United States Patent

Paoli et al.

[15] 3,641,459

[45] Feb. 8, 1972

[54] APPARATUS AND METHOD FOR NARROWING THE PULSE WIDTH AND STABILIZING THE REPETITION RATE IN SEMICONDUCTOR LASERS EXHIBITING SELF-INDUCED PULSING

[72] Inventors: Thomas L. Paoli, Chatham; Jose E. Ripper, North Plainfield, both of N.J.

[73] Assignee: Bell Telephone Laboratories, Incorporated, Murray Hill, N.J.

[22] Filed: Dec. 1, 1969

[21] Appl. No.: 881,184

Related U.S. Application Data

[63] Continuation-in-part of Ser. No. 833,365, June 16, 1969, abandoned.

[52] U.S. Cl. ........................................... 331/94.5, 317/234
[51] Int. Cl. .......................................................... H01s 3/18
[58] Field of Search .................... 331/94.5; 250/199, 217 SS; 317/235; 332/7.5; 313/108 D

[56] References Cited

UNITED STATES PATENTS

| | | | |
|---|---|---|---|
| 3,258,569 | 6/1966 | Green | 200/148 |
| 3,459,942 | 8/1969 | Anderson | 250/199 |
| 3,478,280 | 11/1969 | Fenner | 332/7.51 |
| 3,483,383 | 12/1969 | Konnerth | 250/199 |
| 3,521,073 | 7/1970 | Brock et al. | 250/217 |

OTHER PUBLICATIONS

Lanza: "Method of Modulating the width of the Light Output Pulse of an Injection *Laser*" *IBM Technical Disclosure Bulletin*, vol. 7, pg 262, August, 1964

*Primary Examiner*—Ronald L. Wibert
*Assistant Examiner*—Edward S. Bauer
*Attorney*—R. J. Guenther and Arthur J. Torsiglieri

[57] ABSTRACT

The width of pulses in the output of a semiconductor laser exhibiting self-induced pulsing is narrowed and its repetition rate stabilized by applying to the laser a perturbation signal having a frequency that is related to the pulse repetition rate as the ratio of two integral numbers.

13 Claims, 4 Drawing Figures

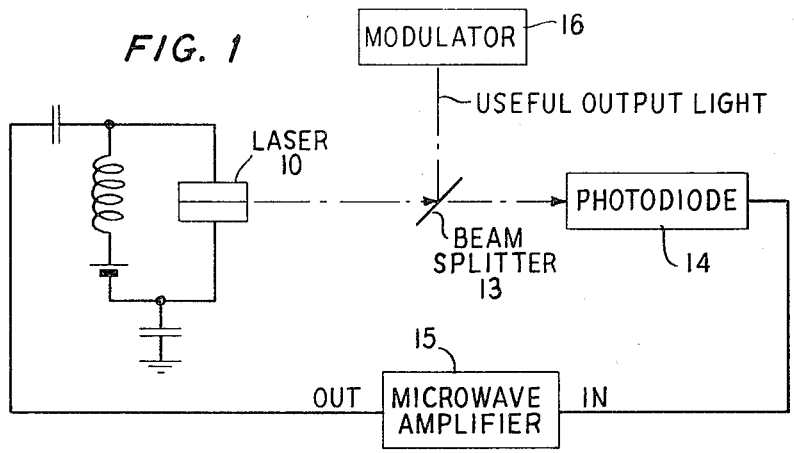
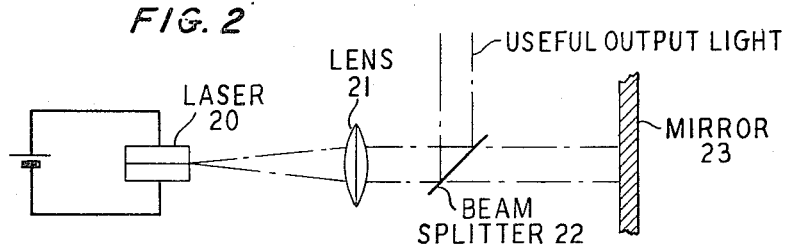
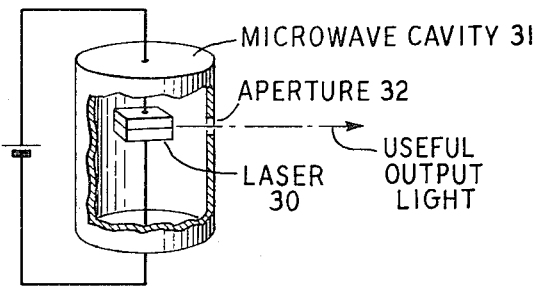
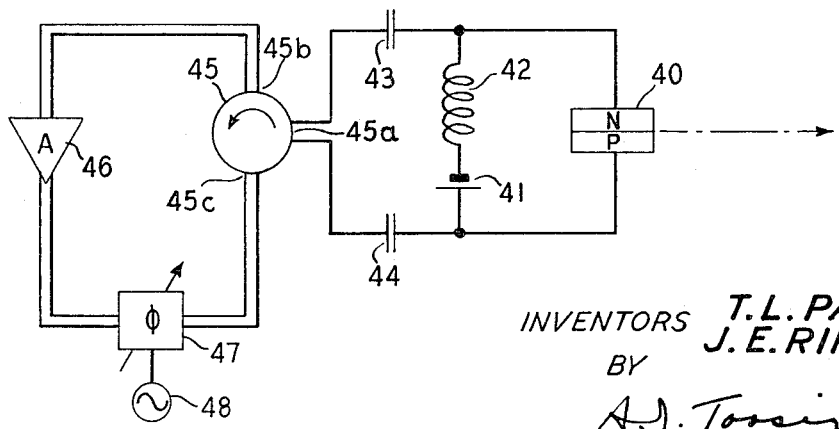

APPARATUS AND METHOD FOR NARROWING THE PULSE WIDTH AND STABILIZING THE REPETITION RATE IN SEMICONDUCTOR LASERS EXHIBITING SELF-INDUCED PULSING

This application is a continuation-in-part of application Ser. No. 833,365 filed on June 16, 1969 and now abandoned.

BACKGROUND OF THE INVENTION

We have observed that continuously operating semiconductor junction lasers, at suitable values of temperature and current, exhibit a self-induced pulsing effect, that is they produce a sequence of light pulses, at microwave repetition rates. (T. L. Paoli and J. E. Ripper, "Coupled Longitudinal Mode Pulsing in Semiconductor Lasers," *Phys. Rev. Letters*, 22, 1085, May 26, 1969). The self-induced pulsing of semiconductor lasers is attributed to coupling among the longitudinal modes of the laser and the high dispersion of semiconductor materials. Thus theory indicates that it occurs in semiconductor lasers other than PN junction lasers and for pumping mechanisms other than current injection.

In application Ser. No. 833,522 filed June 16, 1969 and entitled, "Method for Modulating Semiconductor Lasers," we disclose a method for pulse-position modulating semiconductor lasers exhibiting self-induced pulsing by phase-locking the repetition rate of the laser to a microwave signal, and in a second application, Ser. No. 833,366, filed June 16, 1969 and entitled, "Method for Pulse-Width Modulating Semiconductor Lasers," we disclose a method for modulating the pulse width in such lasers.

A source of narrow optical pulses at microwave repetition rates is highly useful for a variety of applications. For example, in a number of optical pulse modulation schemes, the narrower the pulses, the more desirable is the source, since a larger number of channels can be time-multiplexed. In addition, narrow pulse sources are potentially important for use as clock signals in optical computers. Accordingly, the present invention is directed toward a method for narrowing the pulse width, and in addition stabilizing the repetition rate, in the output of semiconductor lasers exhibiting self-induced pulsing.

BRIEF SUMMARY OF THE INVENTION

In accordance with the invention, the width of pulses in the output of a semiconductor laser exhibiting self-induced pulsing is narrowed, and its repetition rate stabilized, by applying to the laser a perturbation signal having a frequency that is related to the pulse repetition rate as the ratio of the two integral numbers, such as, for example, the pulse repetition rate itself or a harmonic thereof. This may advantageously be accomplished by using the repetition rate of the laser to automatically determine the frequency of the applied signal. The perturbation signal can be any signal that modulates either the optical field of the laser or the population inversion.

BRIEF DESCRIPTION OF THE DRAWINGS

The nature, features and advantages of the present invention will be more readily understood from the following discussion taken in conjunction with the accompanying drawings in which:

FIG. 1 is a schematic view of a first embodiment of the invention employing amplified photoelectric feedback;

FIG. 2 is a schematic view of a second embodiment of the invention employing an optical feedback arrangement;

FIG. 3 is a schematic view of a third embodiment of the invention employing an external microwave cavity; and FIG. 4 is a schematic view of a fourth embodiment of the invention employing purely electrical feedback.

DETAILED DESCRIPTION

FIG. 1 is a schematic view of an apparatus for narrowing the pulses and stabilizing the repetition rate of a self-pulsing laser in accordance with one embodiment of the invention comprising a PN junction laser 10 suitably coupled to both a DC voltage source 11 and the amplified output of a high-speed photodiode 14 such as a PIN diode. The DC voltage is chosen to produce self-induced pulses in the output of laser 10. This voltage typically depends on the particular laser and the temperature. For gallium arsenide stripe geometry junction lasers at liquid nitrogen temperatures, the voltage is typically that required to produce between a 1.1 and 3 times the threshold current for lasing. The pulse repetition rate is typically between 0.5 and 3 gigaHertz. The exact range of DC voltages for a particular laser can be determined empirically by varying the voltage, detecting the laser light with a photodiode and examining the photodiode output in a microwave spectrum analyzer.

While every junction laser tested exhibited spontaneous pulsing for some values of temperature and voltage, one specific example of such a laser will be given for purposes of clarity.

EXAMPLE 1

A gallium arsenide junction laser was fabricated in the following manner. An n-doped substrate was formed by growing a tellurium-doped crystal of gallium arsenide by the Czochralski method and slicing the crystal into wafers. The free electron concentration of the substrate was between 3 and 4.5 $\times 10^{18}$ electrons per cubic centimeter. A p-doped region was diffused into the substrate using the well-known box method with a source comprising a 2.0 percent solution of zinc in gallium saturated with gallium arsenide. The diffusion time was 4 hours at 800° C. The depth of the junction thus formed was about 1.8 microns.

The substrate was then heat treated. After a protective layer of about 950 angstroms of $SiO_2$ was applied, the substrate, along with a few milligrams of pure arsenic, was placed in a quartz ampul (having a volume of about 7 cubic centimeters). The ampul was evacuated to a pressure of $10^{-7}$ millimeters of mercury. The ampul was then heated 4 hours at 850° C. and quenched to 0° C. by immersion in ice water.

After the heat-treating step, the electrical contacts to the N- and P-regions of the diode were formed. Stripes having dimensions 25.5 ×380 microns were cut through the oxide on the P-doped region by photolithographic methods. A second diffusion was then carried out in order to make good ohmic contact to the P-doped region. (This diffusion does not alter the original diffusion and is used only to make good contacts.) This step was carried out by the box method, using a pure zinc arsenide source and a diffusion time of 15 minutes at 650° C. This diffusion formed a heavily-doped layer in the P-region with a thickness of less than 3,000 angstroms. A metal contact comprising 500 angstroms of titanium, 5,000 angstroms of silver, and 1,000 angstroms of gold was then applied to the P-region. The N-doped side was lapped down to a thickness of about 105 microns and a contact comprising 2,000 angstroms of tin, 4,000 angstroms of nickel and 4,000 angstroms of gold was applied. The substrate was then scribed and cleaved to form individual Fabry-Perot cavities having final dimensions on order of 100 ×380 ×625 microns.

The finished laser was then mounted on a copper heat sink in a microwave package having a window so that light from the laser could emerge. The package was inserted as the termination of a 50 ohm transmission line, designed in accordance with well-known microwave techniques to provide good coupling of external microwave signals into the laser.

Over certain ranges of injection current (between 1 and 2 times threshold) at heat-sink temperatures between 77° K. and 110° K., the light intensity from the laser consisted of spontaneously generated pulses at repetition rates between 500 mHz., and 1,200 mHz. For example, at a current of 670 ma. and a heat-sink temperature of 96° K., pulses whose total width at the half-power point was approximately 400 p. sec. were generated at a repetition rate of about 620 mHz. When modulated by approximately 0.5 mw. of microwave power at this frequency, the pulse width was reduced to less than 200 picoseconds (this measurement being limited by the resolution of the detection system).

In addition, in another diode fabricated in the above-described manner, when operating at a current of 394 ma., a heat-sink temperature of 93° K. and a pulse repetition rate of about 680 mHz., the line width of the repetition rate measured at the half-power points was reduced from about 1,500 kHz. without feedback to less than 100 kHz. with feedback, thus providing significant stabilization of the pulsing output. These lasers were operated for about 200 hours over a period of 6 weeks with no noticeable change in their characteristics.

The photodiode 14 is disposed so as to receive the portion of the laser light passing through beam splitter 13. The electrical signal from diode 14 is amplified by microwave amplifier 15 and added to the voltage applied to the laser. The laser pulse repetition rate adjusts itself until the feedback loop provides a signal in phase with the self-induced pulses. The amount of pulse narrowing depends upon the gain in the feedback loop: the higher the gain, the narrower the pulse. The feedback automatically adjusts to changes in the pulse repetition rate. The useful light output is that portion which is reflected by beam splitter 13. The output can be utilized, for example, by directing it onto an external modulator 16, such as one of the known optical pulse code modulators. Similar arrangements can be used for semiconductor lasers other than PN junction lasers by using the amplified feedback signal to modulate the pumping source. For example, the amplified feedback signal can be used to modulate an electron beam or a light source.

FIG. 2 is a schematic view of apparatus for narrowing the pulse width and stabilizing the repetition rate of a self-pulsing laser using optical feedback. In the figure, light from pulsing laser 20 passes through collimating lens 21 and a portion also passes through beam splitter 22 to mirror 23. After being reflected, a portion of the light is then focused back into the active region of the laser. Narrowing of the pulses and stabilization of the repetition rate is achieved when $NF = MC/2L$ where $N$ and $M$ are integers, $F$ is the pulse repetition rate, $C$ the speed of light and $l$ the optical pathlength between the laser and the mirror. As may be seen from the above formula, the frequency of the perturbation signal is related to the pulse repetition rate by the ratio of two integral numbers. One of the advantages of this technique is that it can be easily used with semiconductor lasers that are pumped by means other than current injection.

FIG. 3 is a schematic view of apparatus for narrowing self-induced pulses and stabilizing their repetition rate by coupling the laser to an external microwave cavity. The figures show the laser 30 disposed with a microwave cavity 31 having a resonant frequency approximately equal to the repetition rate of the laser or a multiple thereof. When the laser is spontaneously pulsing, a small modulation of the same frequency appears in the injection current. This modulation of the injection current is sufficiently built up by placing the laser in the microwave resonant cavity that the output pulses are significantly narrowed. The cavity 31 can include a small aperture 32 through which the laser output can pass.

FIG. 4 is a schematic view of a purely electrical feedback arrangement for narrowing the pulses and stabilizing the repetition rate of a self-pulsing laser diode 40. This embodiment, as well as the one of FIG. 3, advantageously eliminates the need for optical alignment inherent in the embodiments of FIGS. 1 and 2. As before, the laser is pumped by a DC current supplied by source 41, shown illustratively as a battery, which forward biases the PN diode 40. A choke 42 is included in series with the battery to prevent microwave energy from entering the source. In addition, the diode 40 is coupled through a pair of capacitors 43 and 44 to port 45a of microwave circulator 45. The remaining two ports 45b and 45c are connected in series with a microwave amplifier 46 and a variable phase shifter 47 which is driven by an information source 48. For the moment, omit consideration of the phase shifter 47 and its drive source 48.

In operation, the microwave energy generated at the pulse repetition rate (or a harmonic thereof) of laser diode 40 is coupled into port 45a, out of port 45b, amplified by amplifier 46 and fed back through ports 45c and 45a to the diode, thus modulating the injection current and producing, as previously described, narrowing of the pulse width and stabilization of the repetition rate. For example, when operating at a repetition rate of 540 mHz., this embodiment was effective in reducing the pulse width from 400 picoseconds to less than 180 picoseconds and in reducing the repetition rate linewidth from 600 kHz. to less than 30 kHz.

Inclusion of the phase shifter 47 and source 48 into the resonant feedback loop formed by the circulator 45, the amplifier 46 and the phase shifter, permits the pulsing output of laser diode 40 to be readily pulse position modulated, since as previously mentioned, the feedback or perturbation signal is required to be in phase with the repetition rate. Hence, varying the phase of the feedback signal varies the positions of the pulses. This variation is in accordance with information carried by source 48.

What is claimed is:
1. A method for narrowing the pulse width and stabilizing the repetition rate in the output of a semiconductor laser exhibiting self-induced pulsing comprising the steps of:
producing self-induced pulsing at a relative constant repetition rate in the output of a semiconductor laser; and
applying to said laser a perturbation signal having a frequency related to the pulse repetition rate of said laser as the ratio of two integral numbers, said frequency determined automatically by the pulsing behavior of said laser through a feedback arrangement.

2. The method according to claim 1 wherein said perturbation signal is produced by amplifying the output of a photodiode receiving a portion of said laser output and applying the amplified output to the laser pumping source.

3. The method according to claim 1 wherein said perturbation signal is a portion of the optical output of said laser applied to the active region of said laser.

4. The method according to claim 1 wherein:
said semiconductor laser is a PN junction laser;
said self-induced pulsing is produced by a DC voltage source;
and the perturbation signal is applied to said laser by disposing it in a microwave cavity having a natural resonance frequency near the repetition rate of said laser.

5. The method according to claim 1 wherein said semiconductor laser is pumped by an injection current and wherein said perturbation signal is produced by amplifying the microwave energy produced by said laser at its repetition rate or a harmonic thereof, and feeding back said amplified energy into the injection current of said laser.

6. Optical apparatus comprising, in combination,
a semiconductor laser;
means for applying suitable pumping energy to said laser to produce self-induced pulsing at a relatively constant repetition rate; and
means for applying to said laser a perturbation signal at a frequency related to the pulse repetition rate of said laser as the ratio of two integral numbers, said frequency determined automatically by the repetition rate of said laser, thereby to narrow the pulse width and stabilize the repetition rate of said pulses.

7. An optical pulse code modulation system having as a source of optical pulses apparatus according to claim 6 wherein:
said means for applying a perturbation signal to said laser comprises a photodiode for receiving optical output from said laser and an amplifier coupled to the output of said photodiode for amplifying the photodiode signal and adding it to the pumping source.

8. Apparatus according to claim 6 wherein:

said means for applying a perturbation signal to said laser comprises optical feedback means for applying a portion of the optical output to the active region of the laser.

9. Apparatus according to claim 6 wherein:
said semiconductor laser is a PN junction laser; and,
said means for applying a perturbation signal comprises an external microwave resonant cavity surrounding said laser.

10. Apparatus according to claim 6 wherein:
said laser includes injection current pumping means,
means for extracting microwave energy produced by said laser at its repetition rate or a harmonic thereof,
means for amplifying said extracted microwave energy; and
means for feeding back said amplified microwave energy into the injection current of said laser.

11. Apparatus according to claim 10 in combination with means included in said feedback means for varying the phase of said feed back microwave energy, thereby to pulse position modulate the pulsing output of said laser.

12. Apparatus according to claim 10 wherein: said pumping means comprise a DC source of voltage connected across opposite sides, said laser and an inductor connected in series with said source,
said feedback means includes a three-port microwave circulator,
said extracting means comprises capacitive coupling between said laser and one port of said circulator and 13. An optical pulse code modulating system comprising:
an optical code modulator; and one or more light sources according to claim 6 disposed to pass light onto said modulator.
said amplifying means comprises a microwave amplifier connected across the remaining two ports of said circulator such that signals amplified by said amplifier are coupled through said circulator to said one port.

* * * * *